Aug. 26, 1969  P. G. VENABLE  3,462,973
UNIVERSAL COUPLING
Filed April 29, 1968
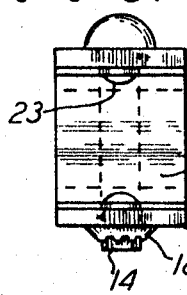
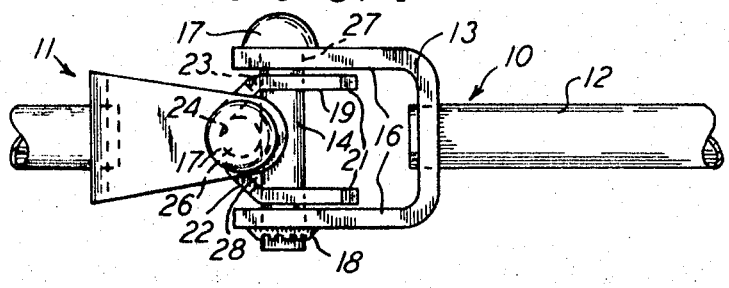
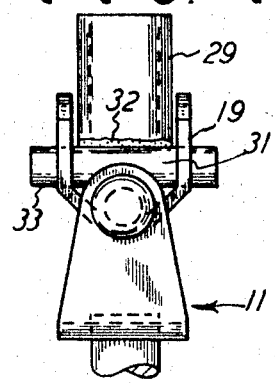
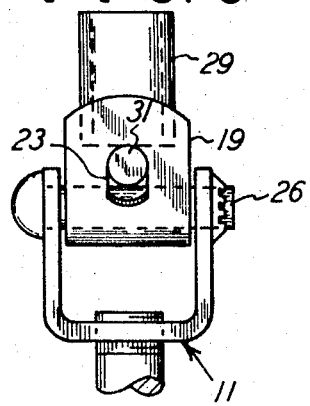
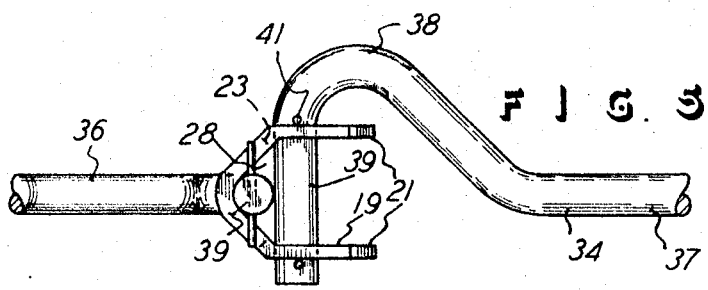
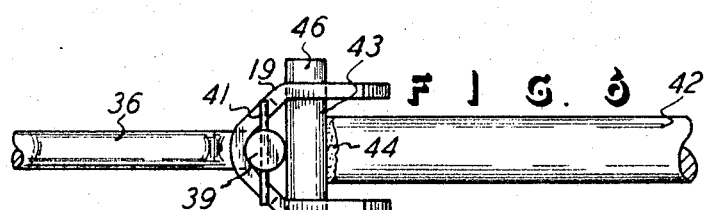
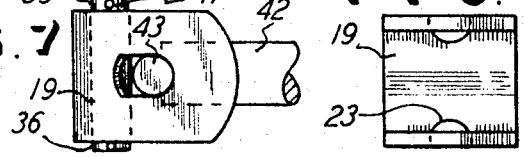
INVENTOR:
PHILLIP G. VENABLE
*Arthur J. Hansmann*
ATTORNEY

United States Patent Office 3,462,973
Patented Aug. 26, 1969

3,462,973
UNIVERSAL COUPLING
Phillip G. Venable, Orion, Ill., assignor to J. I. Case Company, Racine, Wis., a corporation of Wisconsin
Filed Apr. 29, 1968, Ser. No. 724,778
Int. Cl. F16d 3/48
U.S. Cl. 64—17                11 Claims

ABSTRACT OF THE DISCLOSURE

A universal coupling including a driving member and a driven member with connecting pieces between the members for transmitting rotation from one member to the other. The connecting pieces include pin portions on the respective two members, and they include a connector which connects the pins together. The connector is U-shaped, and it provides the necessary openings for receiving the two pins.

Background of the invention

This invention relates to a universal coupling of the type used to transmit rotary motion from a driving member to a driven member, and to do so when said members are at an angle with respect to each other.

Universal couplings are commonly known, and they generally include a driving member and a driven member connected by means of clevises on the ends of the members and with a block having pins extending therefrom and into the clevises. One example of such prior art coupling is shown in U.S. Patent 2,304,766 which shows a basic coupling arrangement. At this time, it will also be mentioned that the said patent shows the coupling to have its connecting pins offset with respect to each other, and the pins are of course transverse with respect to each other for permitting angulation between the driving and driven members.

These prior couplings are commonly concerned with the accurate transmission of rotary motion from one member to the other. Therefore, the couplings are precisely made, and they are accordingly difficult to manufacture, expensive to manufacture, and occasionally they bind and then prevent the desired action. Further, universal couplings known in the prior art are generally provided for transmission of high torques or speeds. Accordingly, the prior couplings are made with special parts, whether those parts be sturdy, heavy, large, or precision parts.

The present invention is an answer to the problems of providing a universal coupling which is a general improvement over those heretofore known, and which overcomes the aforementioned problems. Further, the universal coupling of this invention is of a maximum strength but light weight so that it can be utilized in installations where these characteristics are important. Also, the universal coupling of this invention is outstandingly economical to manufacture, and it requires no special attention or lubrication for maintaining it in operation. To accomplish these very desirable features, this coupling is made of a minimum of parts and with a minimum of machining.

Brief description of the drawings

FIG. 1 is a side elevational view of one embodiment of this invention.

FIG. 2 is an end elevational view of FIG. 1, with parts removed.

FIG. 3 is a side elevational view of another embodiment of this invention.

FIG. 4 is a side elevational view of FIG. 3.

FIG. 5 is a top plan view of still another embodiment of this invention.

FIG. 6 is a top plan view of still another embodiment of this invention.

FIG. 7 is a front elevational view of FIG. 6, with parts broken away.

FIG. 8 is a side elevational view of a part used in all said embodiments.

Detailed description of the preferred embodiments

FIGS. 1 and 2 show one embodiment of the invention, and it shows members 10 and 11, which are either driving or driven members, respectively. That is, member 10 may be the driving member which rotates about its longitudinal axis and which transmits its rotation to the member 11 which is then the driven member. Members 10 and 11 are identical in this embodiment, and they both include a shaft 12 affixed to a clevis 13 which has a pin 14 extending between the clevis legs 16. The pin 14 is shown to have a bolt head 17 on one end thereof, and it has a fastener 18 on the other end thereof so that the pin 14 is retained on the clevis 13.

The important feature is the inclusion of a connector 19 which is also a U-shaped member having legs 21 and an intermediate portion 22 extending between the legs 21. The connector 19 is made from a flat or planar strip or strap of metal, and it is provided with openings 23 extending through the two legs 21. The planar strap of metal is then bent into the U-shape shown, and it has an arcuate portion 24 which nests partly around the pin on the left in FIG. 1 and designated pin 26.

Thus the pins 14 and 26 respectively extend through the clevises 13 by extending through openings 27 in the clevis legs 16. The pins also connect to the connector 19 to complete the connection between the members 10 and 11. That is, the pin 14 extends through the connector leg openings 23, and the pin 14 is snug within the openings 23 for the purpose of transmitting rotation between the member 10 and the pin 14. Also, the pin 26 extends across the width of the connector 19, and the pin 26 extends between the connector intermediate portion 22 and the pin 14, as shown in FIG. 1. Thus the pins 14 and 26 are snug with the connector 19, and rotation between the members 10 and 11 is therefore precisely transmitted.

Of course the pins 14 and 26 are shown to be transversely disposed with respect to each other, and they are also offset with respect to each other but are shown to be in abutment. By use of the connector 19, the coupling is made to be accurate and precise in transmitting rotation between the members 10 and 11, and it is also economical and does not require any special attention during operation, such as special lubrication or special provision for keeping foreign matter away from the coupling so that the coupling does not become clogged or bind. FIG. 2 shows the end view of the member 10 with the connector 19, but with the member 11 removed. It will also be understood that the space between the connector intermediate portion 22 and the pin 14 provides the opening 28 which receives the shank portion of the pin 26.

FIGS. 3 and 4 show another embodiment of the invention, and here it will be seen that the member 11, being identical to member 10, is used in this embodiment. Also, the same connector 19 is used. The only difference here is with regard to the member 29 and its attached pin 31. Of course the member 29 and pin 31 replace the member 10, for instance. The member 29 is shown affixed to the pin 31 by means of welding 32. The pin 31 thus replaces the pin 14.

FIG. 4 shows that the pin 31 extends beyond the connector 19 in pin ends 33 which are of a length adequate to prevent the pin 31 from sliding out of the connector openings 23 because of the cross-sectional size of the member 29 with respect to the spacing between the connector legs 21. It will therefore be understood that the pin 31 could be shifted along its axis, but the pin would not be removed from the connector 19 because the member 29 would abut the connector legs 21 before the pin end 33 would clear the connector 19. Therefore, no fasteners are required to retain the pin 31 on the connector 19.

FIG. 5 shows another embodiment of the invention, and here again connector 19 is utilized. In this embodiment, members 34 and 36, which are the driving or driven members, respectively, are formed from one piece of rod material or the like. Thus the members 34 and 36 are identical members, and they have shank portions 37, bent portions 38 and ends 39 which are the pins or pin portions of the members 34 and 36. The two pins 39 also extend through the respective openings in the connector 19, and these openings are defined by the holes 23 in the connector legs and by the space 28 between the connector intermediate portion 22 and the pin 39 on the defined member 34. Fasteners or lock pins 41 extend through the pins 39 and flank the connector 19 as shown, to retain the members 34 and 36 with respect to the connector 19. Of course the members 34 and 36 are both rotatable on the connector 19 about the respective axes of the two pins 39, and thus the members 34 and 36 serve as desired universal coupling for transmitting rotation between the members 34 and 36 and at an angle therebetween.

FIGS. 6 and 7 show still another embodiment of the invention, and here it will be noted that the member 36 is employed, but the member 34 is replaced by a member 42 and a pin 43 which is affixed to the member 42 by means of welding at 44. The pin 43 thus is the same position and serves the same purpose as the pin portion 39 on the member 34. Here again it will be noted that the pin 43 need not be fastened to the connector 19 since the pin ends 46 are of sufficient length so that they will not be moved out of the connector openings 23 because the member 42 is of sufficient cross-sectional size so that it will abut the connector legs 21 before the pin 43 can be so removed.

Since members 34 and 36 are identical, FIGS. 5 and 7 show that these members may be used for extending through either of the two openings described with regard to connector 19 for receiving the respective pins 39. Therefore, FIG. 5 shows the distance between the outer surfaces of the connector legs 21 is adequate to have the fastener pins 41 snug with the legs 21. Also, FIG. 7 shows that the fastener pins 41 on the member 36 are snug with the connector 19. Therefore, the distance between the legs 21 in FIG. 5 is the same as the width of the connector 19 in FIG. 7.

FIG. 8 shows an end view of the connector 19 used in all the embodiments.

What is claimed is:

1. In a universal coupling, a driving member and a driven member, a pin extending on the end of each of said members, a connector having two openings on axes which are transverse to each other and which are offset in nonintersecting locations, each said pin being respectively disposed in said openings for movably connecting said connector to said members for transmitting rotary motion between said members, the improvement comprising said connector being U-shaped to present two leg portions and a connecting portion intermediate said leg portions, the axis of one of said openings in said connector extending through said leg portions at a location spaced from said connecting portion for receiving one of said pins in a position spaced from said connecting portion to provide the other of said openings in the space between said one pin and said connecting portion.

2. The subject matter of claim 1, wherein said connecting portion is arcuate to be concave toward said one pin, and said other pin is cylindrical with a diameter sufficient to extend from said one pin to said concave connecting portion and to nest with said concave connecting portion for being snug in said coupling.

3. The subject matter of claim 1, wherein said connector is a strap bent into the U-shape recited, and having said leg portions spaced apart.

4. The subject matter of claim 1, wherein both said members include clevises with spaced apart legs respectively supporting each said pin.

5. The subject matter of claim 1, wherein said leg portions of said connector are spaced apart and extend beyond said one pin, said one pin being of a length to have the opposite ends thereof simultaneously extend beyond said leg portions, and said member which has said one pin being disposed between said leg portions and being of a size to be spaced from said leg portions a total amount less than the total extent of said one pin beyond said leg portions for preventing said one pin from being removed from said leg portions by sliding said one pin in its said one opening.

6. The subject matter of claim 5, wherein the other of said members is a rod having a bent end which is the other of said pins, said bent end extending over one side of said connector and into said other opening and beyond the other side of said connector, and including a fastener on the extending end of said bent end for securing said other member to said connector.

7. The subject matter of claim 1, wherein said one pin is permanently affixed as a part of one of said members.

8. The subject matter of claim 6, wherein the other of said members includes a clevis for supporting the other of said pins.

9. The subject matter of claim 6, wherein the other of said members is a rod having a bent end which is the other of said pins.

10. The subject matter of claim 1, wherein both said members are rods with each having a bent end which is the respective one of said pins.

11. The subject matter of claim 1, wherein both said members are identical parts, the distance between the outsides of said leg portions is the same as the width of said connector for interchangeability of said members.

References Cited
UNITED STATES PATENTS

| 864,624 | 8/1907 | Douglas | 64—2.6 |
| 1,358,037 | 11/1920 | Thayer | 64—17 |
| 2,463,971 | 3/1949 | Jackson | 287—95 |

HALL C. COE, Primary Examiner

U.S. Cl. X.R.

287—95